G. B. GAY.
Scraper and Sweep Attachment for Plows.
No. 219,456. Patented Sept. 9, 1879.
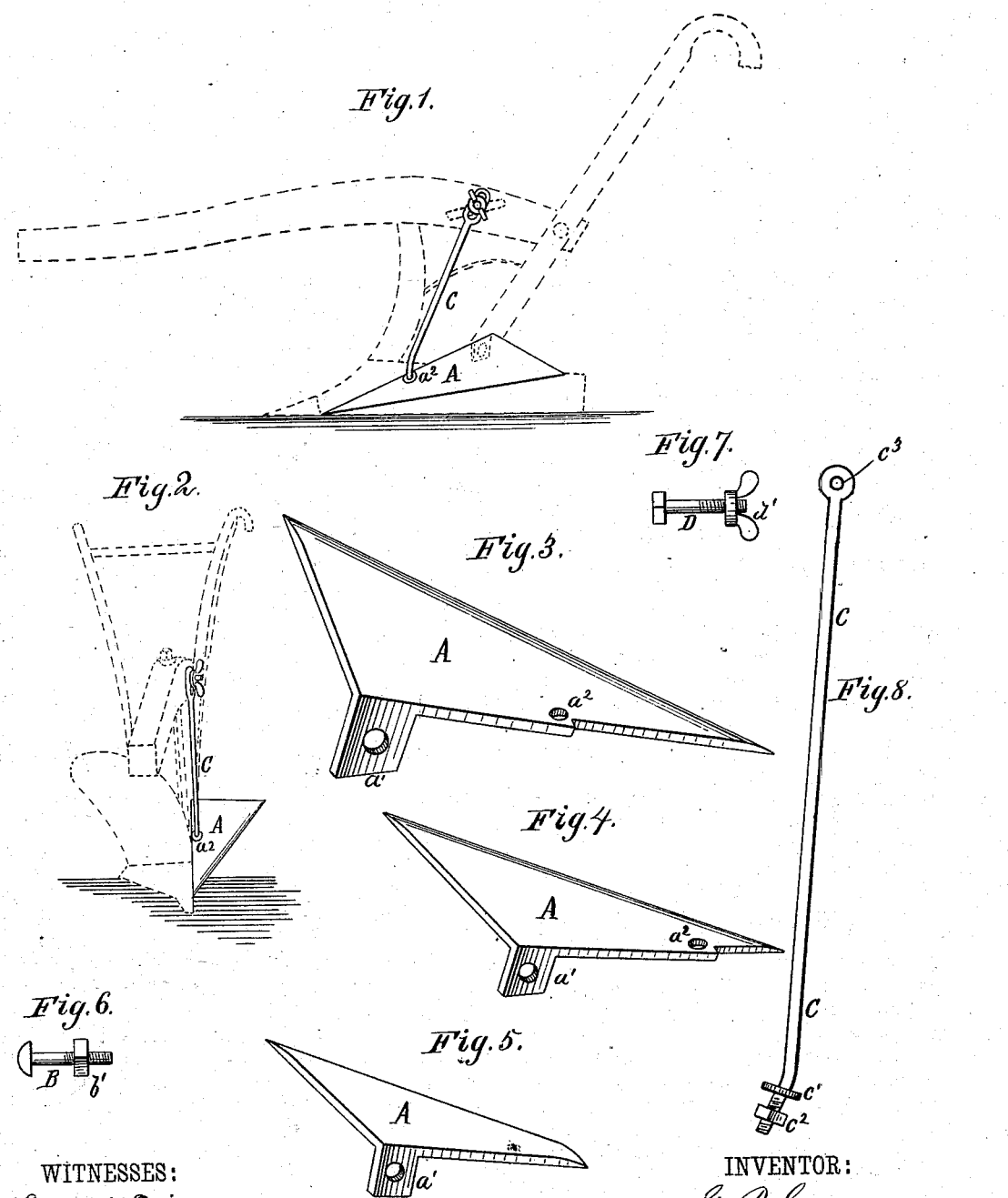

UNITED STATES PATENT OFFICE.

GEORGE B. GAY, OF OPELOUSAS, LOUISIANA, ASSIGNOR TO HIMSELF AND RUDOLPH MAYER, OF SAME PLACE.

IMPROVEMENT IN SCRAPER AND SWEEP ATTACHMENTS FOR PLOWS.

Specification forming part of Letters Patent No. 219,456, dated September 9, 1879; application filed July 22, 1879.

*To all whom it may concern:*

Be it known that I, GEORGE B. GAY, of Opelousas, in the parish of St. Landry and State of Louisiana, have invented a new and useful Improvement in Scraper and Sweep Attachment for Plows, of which the following is a specification.

Figure 1 is a side view of my improved attachment, shown as applied to a plow. Fig. 2 is a front view of the same, shown as applied to a plow. Figs. 3, 4, and 5 are perspective views of different sizes of the attachment. Fig. 6 is a detail view of a bolt and nut for securing the rear part of the device to the plow. Figs. 7 and 8 are detail views of the bolt and rod for connecting the device with the plow-beam.

The object of this invention is to furnish an improved attachment for turn-plows for scraping and sweeping cotton-plants, "laying by" corn, and cultivating other plants, and which shall be simple in construction, convenient in use, and effective in operation.

The invention consists in the combination of the triangular plate, provided with the downwardly-projecting perforated lug or flange at the rear end of its inner edge, and having a hole formed through it near the forward part of its inner edge, the rod provided with a shoulder and a nut at its lower end and a hole or slot at its upper end, and the two bolts and nuts, with each other, to adapt the device to be attached adjustably to a plow, as hereinafter fully described.

Similar letters of reference indicate corresponding parts.

A is a triangular plate, which may be made of various sizes, as the size of the plants and the character of the work to be done may require.

The inner edge of the plate A is so formed as to fit against the land-side of the plow, to which the device is to be applied.

At the rear end of the inner edge of the plate A is formed a downwardly-projecting lug or flange, $a^1$, which has a hole formed through it to receive the bolt B, by which and the nut $b'$ it is secured to the plow.

In the plate A, near its inner edge and a little in front of the center of the said edge, is formed a hole, $a^2$, to receive the lower end of the rod C, which is made with a shoulder $c^1$, to rest upon the upper side of the plate A, and has a nut, $c^2$, screwed upon it upon the lower side of the said plate A.

In the upper end of the rod C is formed a hole or short slot, $c^3$, to receive the bolt D, by which the said rod is secured to the plow-beam, and which is provided with a nut, $d'$, for securing the said rod in place.

The bolt D may be passed through a hole or slot in the plow-beam, or it may be passed through a slot in an iron plate attached to the said plow-beam. In the latter case a recess must be formed in the plow-beam beneath the said slotted plate, to receive the head of the bolt D and allow it to move when adjusting the device.

With this construction, by adjusting the rod C the forward angle or point of the plate A may be raised and lowered, as the size of the plants and the character of the work to be done may require.

The attachment has been described as arranged for the Avery plow. To adapt it for use for other plows, the flange $a^1$ is extended along the inner edge of the plate A to the center of the said edge, and has a hole formed through its forward end, to receive a bolt for fastening it to the land-side of the plow. In this case the hole in the rear part of the lug or flange should be elongated, to allow the attachment to be adjusted as may be required.

Having thus fully described my invention, I claim as new and desire to secure by Letters Patent—

The combination of the triangular plate A, provided with the downwardly-projecting perforated lug or flange $a^1$ at the rear end of its inner edge, and having a hole, $a^2$, formed through it near the forward part of its inner edge, the rod C, provided with a shoulder and nut at its lower end and a hole or slot at its upper end, and the two bolts and nuts B D, with each other, to adapt the device to be attached adjustably to the land-side or bar of a plow, substantially as herein shown and described.

GEORGE B. GAY.

Witnesses:
FRANK POSEY,
T. H. KING.